US009879555B2

(12) United States Patent
Moehrle et al.

(10) Patent No.: US 9,879,555 B2
(45) Date of Patent: Jan. 30, 2018

(54) TURBINE COMBUSTION SYSTEM TRANSITION SEALS

(75) Inventors: Frank Moehrle, Palm City, FL (US); Andrew R. Narcus, Loxahatchee, FL (US); John Carella, Jupiter, FL (US); Jean-Max Millon Sainte-Claire, Jupiter, FL (US)

(73) Assignee: Siemens Energy, Inc., Orlando, FL (US)

( * ) Notice: Subject to any disclaimer, the term of this patent is extended or adjusted under 35 U.S.C. 154(b) by 1216 days.

(21) Appl. No.: 13/279,396

(22) Filed: Oct. 24, 2011

(65) Prior Publication Data

US 2012/0292860 A1 Nov. 22, 2012

Related U.S. Application Data

(60) Provisional application No. 61/488,209, filed on May 20, 2011.

(51) Int. Cl.

| | |
|---|---|
| ***F02C 7/28*** | (2006.01) |
| ***F01D 11/00*** | (2006.01) |
| ***F01D 9/02*** | (2006.01) |

(52) U.S. Cl.

CPC ............ *F01D 11/005* (2013.01); *F01D 9/023* (2013.01); *F05D 2230/21* (2013.01); *F05D 2230/232* (2013.01); *F05D 2240/55* (2013.01); *F05D 2260/37* (2013.01); *F05D 2260/38* (2013.01)

(58) Field of Classification Search

USPC ........ 277/643–644, 648, 653, 654, 630, 637

See application file for complete search history.

(56) References Cited

U.S. PATENT DOCUMENTS

| | | | | |
|---|---|---|---|---|
| 4,184,689 | A * | 1/1980 | Brodell et al. | 415/134 |
| 4,785,623 | A | 11/1988 | Reynolds | |
| 5,265,412 | A | 11/1993 | Bagepalli et al. | |
| 5,400,586 | A | 3/1995 | Bagepalli et al. | |
| 5,474,306 | A | 12/1995 | Bagepalli et al. | |
| 6,076,835 | A * | 6/2000 | Ress et al. | 277/637 |
| 6,450,762 | B1 | 7/2002 | Munshi | |
| 6,547,257 | B2 | 4/2003 | Cromer | |
| 6,588,214 | B2 | 7/2003 | Mack et al. | |
| 6,675,584 | B1 | 1/2004 | Hollis et al. | |
| 6,834,507 | B2 | 12/2004 | Jorgensen | |
| 6,968,615 | B1 * | 11/2005 | More et al. | 29/888.3 |
| 7,527,469 | B2 | 5/2009 | Zborovsky et al. | |

(Continued)

FOREIGN PATENT DOCUMENTS

FR 2887588 A1 12/2006

*Primary Examiner* — Matthieu F Setliff
*Assistant Examiner* — Thomas Neubauer

(57) ABSTRACT

Respective seals (54, 78) for the upper and lower spans (48A, 48B) of an exit frame (48) of a turbine combustion system transition piece (28). Each seal has a first strip (55, 79) and a second strip (66, 88) of a sealing material. The two strips of each seal are attached together along a common edge. The second strip is flexible, generally parallel to the first strip, and has a bead (72, 90) along its free edge. This forms a spring clamp that clamps a rail (68, 86) of the exit frame between the bead and the first strip of each seal. A tab extends axially aft from the first strip of each seal for insertion into a circumferential slot (58, 82) in a turbine inlet support structure (52, 76), thus sealing the transition piece (46) to the turbine inlet for efficient turbine operation.

20 Claims, 3 Drawing Sheets

(56) References Cited

U.S. PATENT DOCUMENTS

| | | | | |
|---|---|---|---|---|
| 7,549,845 | B2 * | 6/2009 | Uwami et al. | 416/198 A |
| 7,584,620 | B2 | 9/2009 | Weaver et al. | |
| 7,594,792 | B2 * | 9/2009 | Audeon et al. | 415/135 |
| 7,784,264 | B2 | 8/2010 | Weaver et al. | |
| 7,938,407 | B2 * | 5/2011 | Datta et al. | 277/644 |
| 2002/0121744 | A1 | 9/2002 | Aksit et al. | |
| 2002/0163134 | A1 | 11/2002 | Cromer | |
| 2003/0066292 | A1 | 4/2003 | Mack et al. | |
| 2006/0123797 | A1 * | 6/2006 | Zborovsky et al. | 60/800 |
| 2008/0053107 | A1 * | 3/2008 | Weaver et al. | 60/800 |
| 2008/0166233 | A1 * | 7/2008 | Johnson et al. | 415/230 |
| 2010/0011774 | A1 | 1/2010 | Johnson et al. | |
| 2010/0054928 | A1 * | 3/2010 | Schiavo | 415/182.1 |
| 2010/0061837 | A1 * | 3/2010 | Zborovsky et al. | 415/58.4 |
| 2010/0247286 | A1 * | 9/2010 | Maldonado | 415/1 |
| 2012/0119447 | A1 * | 5/2012 | Demiroglu et al. | 277/637 |

* cited by examiner

FIG 1
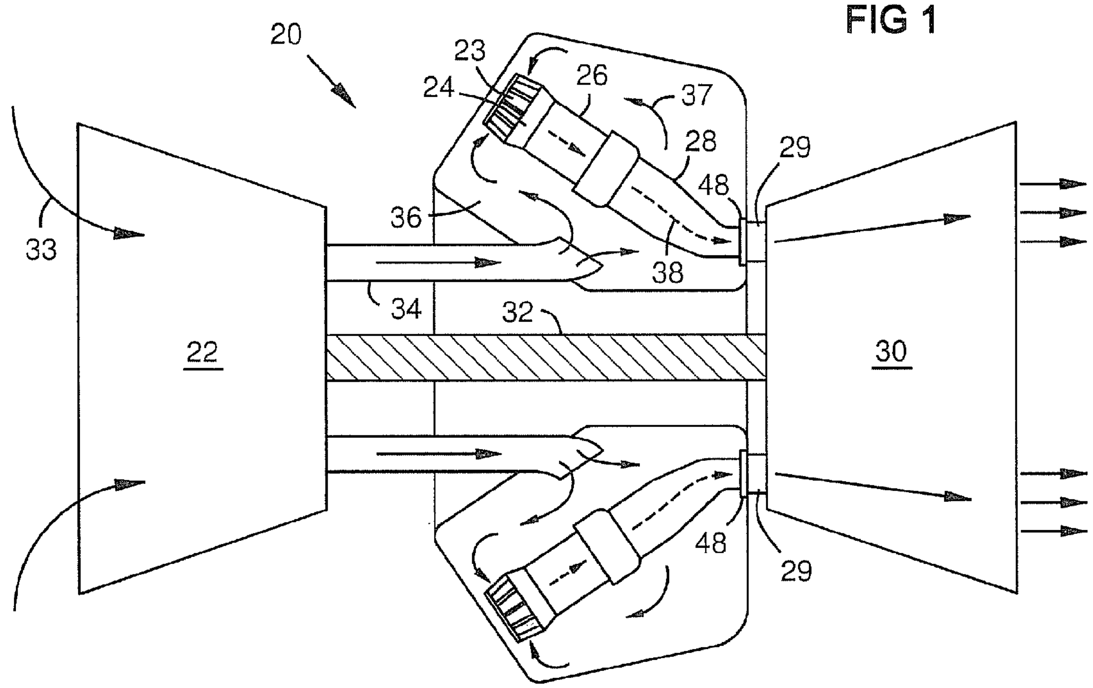
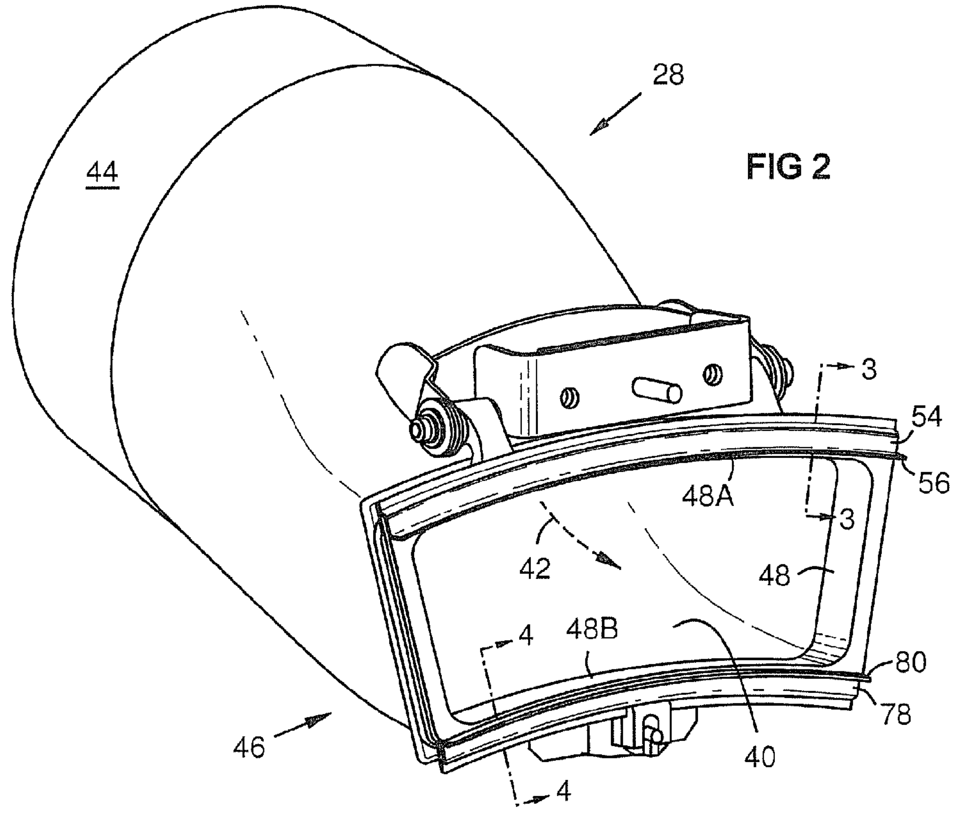
FIG 2

FIG 3
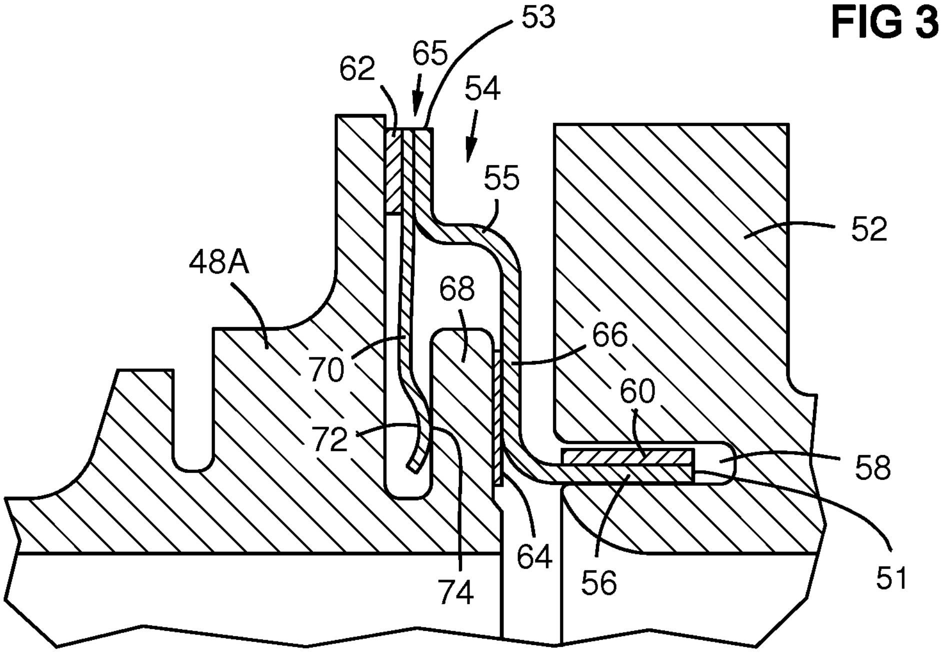
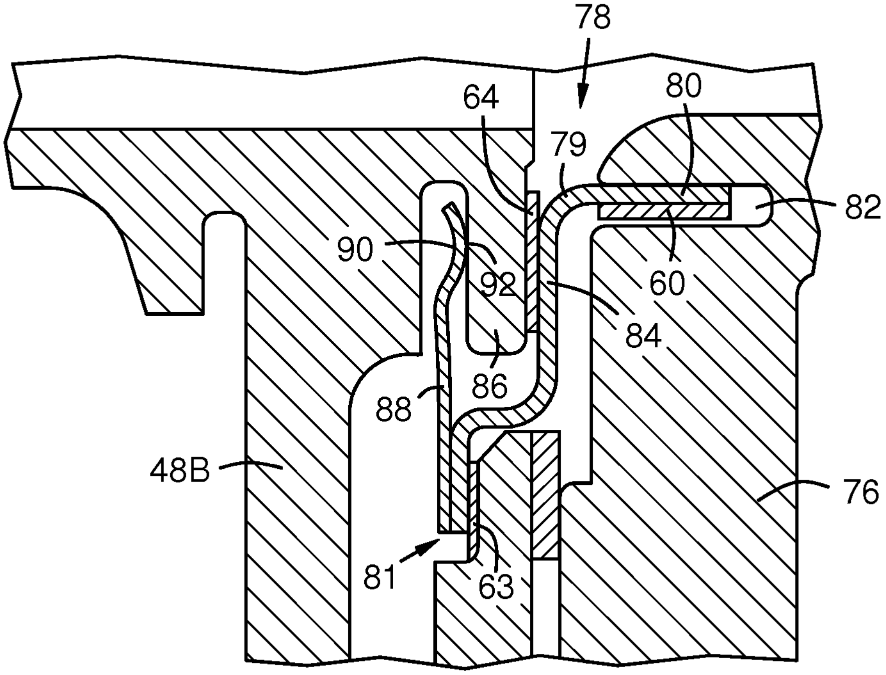
FIG 4

TURBINE COMBUSTION SYSTEM TRANSITION SEALS

This application claims benefit of the 20 May 2011 filing date of U.S. Application No. 61/488,209 which is incorporated by reference herein.

FIELD OF THE INVENTION

This invention relates to seals in the combustion section of gas turbines, and particularly to upper and lower seals between the transition duct and the turbine inlet.

BACKGROUND OF THE INVENTION

A typical industrial gas turbine engine has multiple combustion chambers in a circular array about the engine shaft in a "can annular" configuration. A respective array of transition ducts, also known as transition pieces, connects the outflow of each combustor to the turbine inlet. Each transition piece is a tubular structure that channels the combustion gas flow between a combustion chamber and the turbine section.

The interface between the combustion system and the turbine section occurs between the exit end of each transition piece and the inlet of the turbine. One or more turbine vanes mounted between outer and inner curved platforms is called a nozzle. Retainer rings retain a set of nozzles in a circular array for each stage of the turbine. Upper and lower seals on an exit frame of each transition piece seal against respective outer and inner retainer rings of the first stage nozzles to reduce leakage between the combustion and turbine sections of the engine. These seals conventionally have sufficient clearance in their slots to accommodate relative dynamic motion and differential thermal expansion between the exit frame and the retainer ring. For this reason, such seals may be called "floating seals". However, such clearance increases gas leakage across the seal, thereby reducing engine efficiency.

BRIEF DESCRIPTION OF THE DRAWINGS

The invention is explained in the following description in view of the drawings that show:

FIG. 1 is a schematic view of an exemplary gas turbine engine within which embodiments of the invention may be employed.

FIG. 2 is a perspective aft view of a combustion system transition piece.

FIG. 3 is a sectional view of an upper span of a transition exit frame and seal taken along line 3-3 of FIG. 2.

FIG. 4 is a sectional view of a lower span of a transition exit frame and seal taken along line 4-4 of FIG. 2.

DETAILED DESCRIPTION OF THE INVENTION

Figure 5:
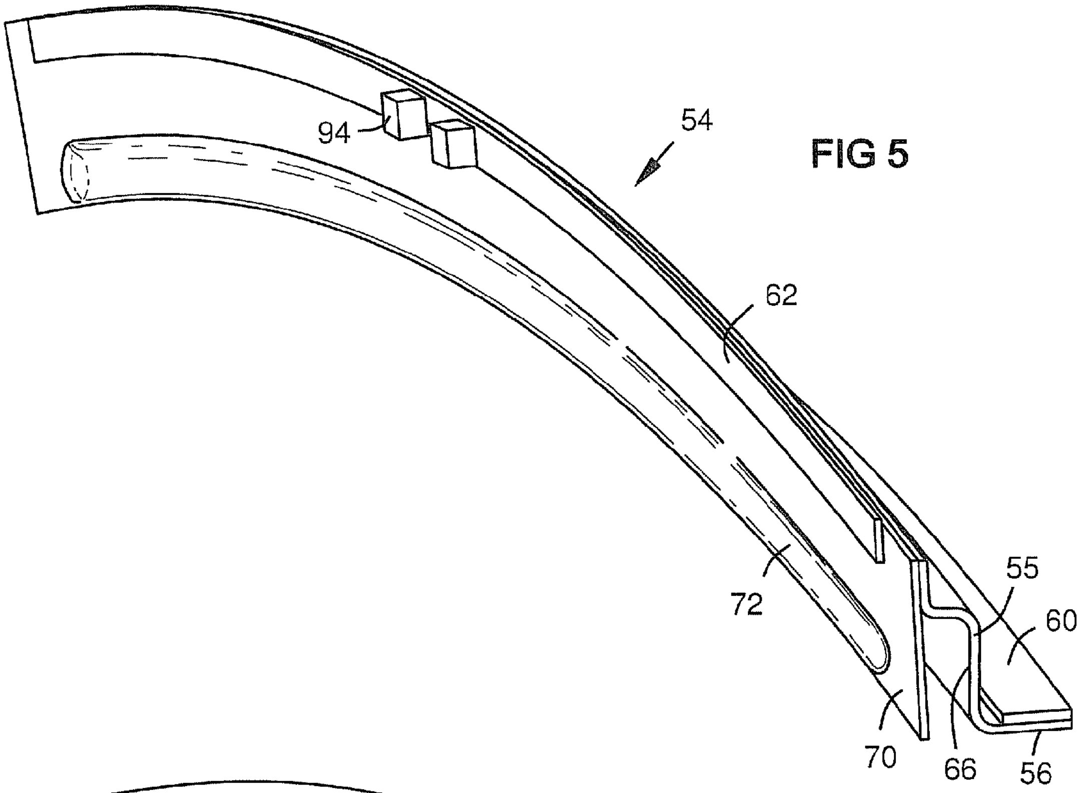
FIG. 5 is a perspective front/side view of an upper seal for a transition exit frame.

FIG. 1 is a schematic view of an exemplary gas turbine engine 20 that may include a compressor 22, fuel injectors within a cap assembly 24, combustion chambers 26, transition pieces 28, a turbine section 30, and an engine shaft 32 by which the turbine 30 drives the compressor 22. Several combustor assemblies 24, 26, 28 are arranged in a circular array in a can-annular design. During operation, the compressor 22 intakes air 33 and provides a flow of compressed air 37 to the combustor inlets 23 via a diffuser 34 and a combustor plenum 36. The fuel injectors within cap assembly 24 mix fuel with the compressed air. This mixture burns in the combustion chamber 26 producing hot combustion gas 38, also called the working gas, that passes through the transition piece 28 to the turbine 30 via a sealed connection between an exit frame 48 of the transition piece 28 and a turbine inlet 29. The diffuser 34 and the plenum 36 may extend annularly about the engine shaft 32. The compressed airflow 37 in the combustor plenum 36 has higher pressure than the working gas 38 in the combustion chamber 26 and in the transition piece 28.

FIG. 2 is a perspective view of an exemplary transition piece 28 that may include an enclosure or transition piece body 40 bounding the working gas path 42. Transition piece body 40 may have various cross sectional geometries including circular or rectangular. For example, the upstream end 44 may be circular and the downstream end 46 may be approximately rectangular with curvature to match the turbine inlet curvature. An exit frame 48 may be attached to the downstream or exit end of the transition piece 28 by welding or other means. The upper and lower spans 48A, 48B of the exit frame 48 are said to have a "circumferential" curvature and extent or length. "Circumferential" herein means generally along, or tangential to, the circumference of a circle that is centered on the turbine axis and is in a plane normal to the turbine axis. The exit frame 48 mates with the turbine entrance nozzle retainer rings (not shown in this view) via upper and lower seals 54, 78. The exit frame 48 may be attached to the retainer rings by bolts. Minimizing leakage between the exit frame and the turbine inlet hardware is critical to achieving engine efficiency and performance goals.

FIG. 3 is a sectional view taken on an axial/radial plane through the upper span 48A of the exit frame 48 (section 3-3 of FIG. 2) assembled against a radially outer retainer ring 52 or other turbine inlet structure. "Axial" and "radial" herein are with respect to the turbine axis. An axial/radial plane is a plane including the turbine axis and a radius there from. The upper seal 54 may include a first strip 55 of a sealing material with an axially extending tab 56 that fits in a circumferentially extending groove 58 in the outer retainer ring 52. As illustrated in FIG. 3, the tab 56 forms a first edge 51 that is a first aixal end and an inner radial surface of the seal 54. The sealing material may be a metal alloy, ceramic material, cermet material or other suitable material known in the art. One or more abrasion-resistant pads 60, 62, 64 or coatings may be attached or applied to the upper seal 54 and/or adjacent contact surfaces as known in the art. Such pads/coatings 60, 62, 64 may be formed, for example, of a metal fabric or a metal coating. The first strip 55 of the upper seal 54 may have a flat intermediate portion 66 that contacts a flat aft surface of a circumferential upper or radially outer rail 68 or a pad/coating 64 thereon. This rail 68 has a height that extends radially outwardly on the upper span 48A of the exit frame 48.

The upper seal 54 may include a second strip 70 that is attached to a second edge 53 of the first strip 55 opposite to the first edge 51. As illustrated in FIG.3 the second strip 70 is cantilevered from the first strip 55 along a common edge 65 of the two strips. As illustrated in FIG. 3, the second edge 53 is a second axial end of the seal 54 opposite to the first axial end at the first edge 51 and the second edge 53 is an outer radial surface of the seal 54. The second strip 70 may be generally parallel to the flat intermediate portion 66 of the first strip 55. The second strip 70 and the flat intermediate portion 66 together form a spring clamp that may slide over the upper rail 68. The second strip 70 has a free or distal edge with a bend that forms a ridge or bead 72 along at least a portion of the free edge that seals along a line of contact 74 with the forward surface of the upper rail 68. The second strip 70 elastically flexes against the forward surface of the upper rail 68 thus maintaining a constant seal along the line of contact 74 while allowing relative movement between the upper span 48A of the exit frame 48 and the outer retainer ring 52. An abrasion resistant coating or pad (not shown) may be attached or applied to the bead 72 or to the upper rail 68 along this interface.

FIG. 4 is a sectional view taken on an axial/radial plane through the lower span 48B of the exit frame 48 assembled against a radially inner retainer ring 76 or other turbine inlet structure. The lower seal 78 may include a first strip 79 of a sealing material with an axially extending tab 80 that fits in a circumferentially extending groove 82 in the lower retainer ring 76. One or more abrasion-resistant pads 60, 63, 64 or coatings may be attached or applied to the lower seal 78 or adjacent contact surfaces as known in the art. Such pads/coatings 60, 63, 64 may be formed, for example, of a metal fabric or a metal coating. The first strip 79 of the lower seal 78 may have a flat intermediate portion 84 that contacts a flat aft surface of a circumferential lower or radially inner rail 86 or a pad 64 thereon. This rail 86 has a height that extends radially inwardly on the lower span 48B of the exit frame 48.

The lower seal 78 may include a second strip 88 that is cantilevered from the edge of the first strip 79 along a common edge 81 of the two strips. The second strip 88 may be generally parallel to the flat intermediate portion 84 of the first strip 79. The second strip 88 and the flat intermediate portion 84 together form a spring clamp that may slide over the lower rail 86. The second strip 88 has a free or distal edge with a bend that forms a ridge or bead 90 along at least a portion of the free edge that seals along a line of contact 92 with the forward surface of the lower rail 86. The second strip 88 elastically flexes against the forward surface of the lower rail 86 thus maintaining a constant seal along the line of contact 92 while allowing relative movement between the lower span 48B of the exit frame 48 and the inner retainer ring 76. An abrasion resistant coating or pad (not shown) may be attached or applied to the ridge or bead 90 or to the lower rail 86 along this interface.

Figure 6:
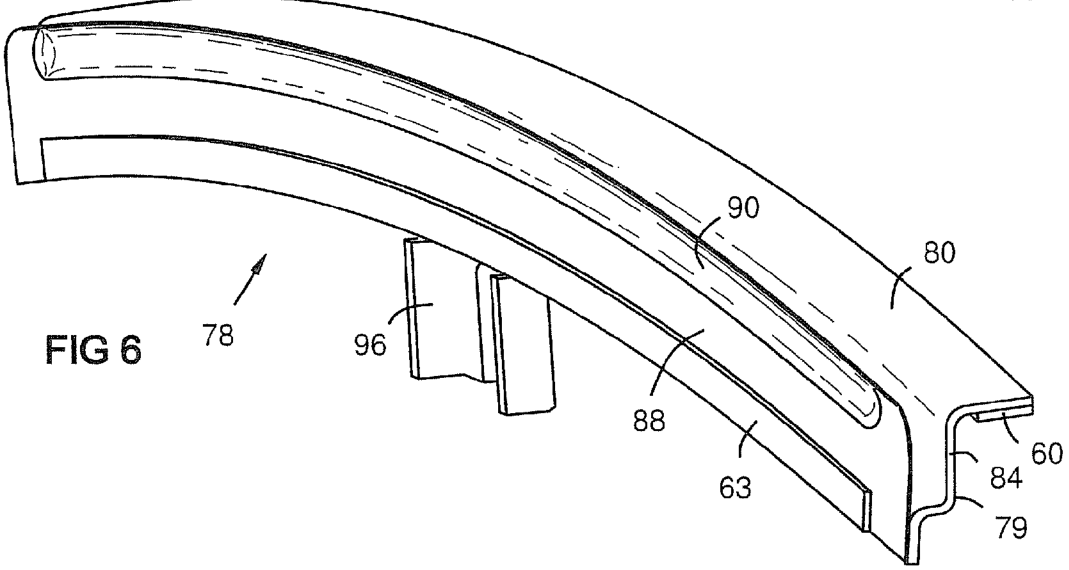
FIG. 6 is a perspective front/side view of a lower seal for a transition exit frame.

FIG. 5 is a perspective view of an exemplary embodiment of the upper seal 54 previously described. One or more brackets or tabs 94 may be attached to the upper seal 54 to retain it in at least the circumferential direction (along its length). FIG. 6 is a perspective view of an exemplary embodiment of the lower seal 78 previously described. One or more brackets or tabs 96 may be attached to the lower seal 78 to retain it in at least the circumferential direction (along its length).

The first strip 55, 79 of each respective seal 54, 78 may be more rigid than the second strip 70, 88 due to greater thickness of the first strip 55, 79 and/or a different material than the second strip 70, 88. For example, the first strip may be a cermet material of a first thickness and the second strip may be a metal alloy of a second thickness thinner than the first thickness. The second strips 70, 88 may be attached to the first strips 55, 79 for example by spot welding, diffusion bonding, transient liquid phase bonding or other known means. Such fabrication allows different alloys and fabrication techniques to be used for the first strips 55, 79 and second strips 70, 88 for specialization or customization of the two parts. For example, a more rigid first strip 55, 79 can maintain the shape of the seal, while a more flexible second strip 70, 88 provides an elastic preload. For economy of fabrication, the first strips 55, 79 may be formed by casting, while the second strips 70, 88 may be formed by sheet metal die-cutting and stamping.

The resulting upper and lower seals 54, 79 provide consistent sealing during extreme thermal operating conditions while preventing undesirable load transfer between the combustion system and turbine system hardware. The spring-loaded clamp design provides pre-tension to firmly seal against the exit frame 48. Thus, these seals improve combustion system efficiency by reducing leakage. In order to maximize engine efficiency and minimize maintenance costs, the present upper and lower exit frame seals allow relative motion between the transition piece and the turbine inlet while maintaining sealing and wear characteristics.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A seal for a turbine combustion system, comprising;

a first strip extending along a circumferential length of a rail of an upper or lower span of a transition exit frame;

a tab extending axially from an intermediate portion of the first strip along a gap between the transition exit frame and a turbine inlet and into a circumferentially extending groove in a retainer ring of the turbine inlet;

a second strip cantilevered from the first strip, said second strip configured to contact a forward surface of the rail on an opposite side of the rail from the gap;

the second strip and the intermediate portion of the first strip forming a spring clamp along the circumferential length of the rail; and the second strip comprising a bead, wherein the rail is flexibly clamped between the bead and the intermediate portion of the first strip wherein the tab forms a first edge of the first strip, and the second strip is attached to the first strip along a second edge of the first strip opposite to the first edge.

2. The seal of claim 1, wherein the intermediate portion of the first strip is flat, and contacts an aft surface of the rail opposite to the forward surface of the rail.

3. The seal of claim 1, further comprising an abrasion-resistant material disposed between the first strip and at least one of the rail and the retainer ring.

4. The seal of claim 1, further comprising an abrasion-resistant material disposed between the second strip and the transition exit frame.

5. The seal of claim 1, wherein the first strip is thicker than the second strip.

6. The seal of claim 1, wherein the first and second strips are formed of respective different materials.

7. The seal of claim 1, wherein the second strip is attached to the first strip along a common edge of the two strips by welding or diffusion bonding.

8. The seal of claim 1, wherein the first strip is cast of a first metal alloy, the second strip is formed of a second metal alloy by stamping, the second strip is attached to the first strip along a common edge of the first and second strips by welding or diffusion bonding, and the first strip is thicker and more rigid than the second strip.

9. The seal of claim 1, wherein the rail has a height that extends radially inwardly from said lower span.

10. The seal of claim 1, wherein said second strip is generally parallel to the intermediate portion, wherein said second strip includes a distal edge with a bend to form a bead along at least a portion of the distal edge to seal a line of contact along the forward surface.

11. The seal of claim 1, wherein the first edge is a first axial end of the seal and the second edge is a second axial end of the seal opposite to the first axial end.

12. The seal of claim 1, wherein the first edge is an inner radial surface of the seal and the second edge is an outer radial surface of the seal.

13. A seal for a turbine combustion system, comprising;

a spring clamp covering a circumferential length of a rail of an upper or lower span of a transition piece exit frame, wherein the rail has a height that extends radially outwardly from said upper span or radially inwardly from said lower span;

the spring clamp comprising a first strip of material contacting an aft surface of the rail;

the spring clamp comprising a second strip of material attached to the first strip along a common edge of the first and second strips, said spring clamp configured such that the common edge is positioned radially outward from the rail of the upper or lower span of the transition piece exit frame;

a bend along a free edge of the second strip of material providing a contact bead, wherein the rail is clamped between the contact bead and the first strip of material by elastic flexing of the spring clamp; and a tab extending axially aft from the first strip of material along a circumferential length thereof and forming a first edge of the first strip opposite to the common edge.

14. The seal of claim 13, wherein the tab fits into a circumferential groove in a turbine inlet retainer ring.

15. The seal of claim 13, wherein the second strip flexes elastically by contact pressure of the bead against a forward surface of the rail.

16. The seal of claim 13, wherein the first strip is thicker and more rigid than the second strip.

17. The seal of claim 13, wherein the first and second strips are formed of respective different metal alloys.

18. The seal of claim 13, wherein the second strip is attached to the first strip along the common edge by welding or diffusion bonding.

19. The seal of claim 13, wherein:

the first strip is cast;

the second strip is formed by sheet metal die-cutting and stamping;

the second strip is attached to the first strip along the common edge by welding or diffusion bonding; and the first strip is thicker than the second strip.

20. The seal of claim 13, further comprising an abrasion-resistant material disposed between at least a portion of the spring clamp and the rail.

* * * * *